(12) United States Patent
Sakemi

(10) Patent No.: US 7,652,782 B2
(45) Date of Patent: Jan. 26, 2010

(54) IMAGE FORMING DEVICE AND IMAGE FORMING METHOD

(75) Inventor: Ryoichi Sakemi, Osaka (JP)

(73) Assignee: Kyocera Mita Corporation, Osaka (JP)

(*) Notice: Subject to any disclaimer, the term of this patent is extended or adjusted under 35 U.S.C. 154(b) by 819 days.

(21) Appl. No.: 11/258,079

(22) Filed: Oct. 26, 2005

(65) Prior Publication Data

US 2007/0091354 A1  Apr. 26, 2007

(51) Int. Cl.
*G06F 15/00* (2006.01)
(52) U.S. Cl. .............. 358/1.15; 358/1.9; 358/1.16; 358/1.17; 707/7
(58) Field of Classification Search .......... 358/1.9, 358/1.13, 1.15, 1.16, 1.18, 1.17
See application file for complete search history.

(56) References Cited

U.S. PATENT DOCUMENTS

| | | | | |
|---|---|---|---|---|
| 5,253,030 | A * | 10/1993 | Shigemura et al. | 399/407 |
| 6,201,610 | B1 * | 3/2001 | Ogino | 358/1.15 |
| 7,268,910 | B2 * | 9/2007 | Catt et al. | 358/1.18 |
| 7,495,789 | B2 * | 2/2009 | Sato | 358/1.15 |

FOREIGN PATENT DOCUMENTS

| | | |
|---|---|---|
| JP | 09-123562 A | 5/1997 |
| JP | 10-129073 A | 5/1998 |
| JP | 2004-195783 A | 7/2004 |

* cited by examiner

*Primary Examiner*—David K Moore
*Assistant Examiner*—Vu B Hang
(74) *Attorney, Agent, or Firm*—Global IP Counselors, LLP

(57) ABSTRACT

A document input from a scanner is used as input image data and is stored in image memory in page number order. A control unit prints the input image data and receives instruction data showing the cutting edge when cutting on the center line of the printing paper from the input unit. The control unit stores the addresses at which the input image data are stored in an array A; the image processing unit sorts the addresses stored in the first or second half of the array A, based on instruction data shown by the instruction data discussed above, in descending order by page number. The image processing unit alternates and stores in an array B addresses stored in the first or second half of the sorted array A, and in the first or second half of the unsorted array A. The print processing unit prints the input image data, in the order stored in the array B, on both sides of printing paper, and attains printing results as shown in FIG. 1.

6 Claims, 12 Drawing Sheets

IMAGE FORMING DEVICE AND IMAGE FORMING METHOD

FIELD OF THE INVENTION

The present invention relates to an image forming device such as a copier, printer, a multi-function machine having these functions, or the like.

BACKGROUND INFORMATION

Before now, with the purpose of improving printing efficiency for image forming devices such as copiers, printers, or the like, a general usage was to print two pages on one sheet of printing paper, of the size of two document pages, and cut along the center line of the printed sheets. A method is known for forming binding holes or binding margins on the sheets, in the case where the printed sheets are cut along the center line of the sheets and stacked, after which binding processing is performed. In devices which do not perform binding processing, an image forming method is known which can stack the pages in ascending order if the printed sheets are stacked in cutting order.

However, these technologies relate to devices including binding processing and cannot be applied in many cases where binding processing is not necessary. When performing a print image forming method with the latter technique, the cutting edges of the cut sheets after printing are not the same because two document pages are combined and printed on the same side of one sheet, as shown in FIG. 2. Therefore, when the printed sheets are stacked, the sheets are not aligned and this situation is not convenient.

Also, with the former image forming method, because the position of the binding margins or binding holes of the printed sheets are different for each page as shown in FIG. 14, a problem is that when the sheets are cut and stacked, the print images are printed in a disordered manner on the fronts and backs of the sheets. In a prior art image forming method, a problem is that the binding margin is not positioned within the sheet, as shown in FIG. 15. When adding the positioning of the binding margin to printing with the latter technique, a problem is that the position of the binding margin varies from page to page because the cutting edge of the paper cut along the center line thereof appears on the right side or the left side (FIG. 16).

The present invention was developed in view of these issues and an object thereof is to provide an image forming device and image forming method which is convenient, and which prevents sheets from becoming unaligned and arranged in descending order by page number, when printed sheets are stacked after the sheets are printed and cut.

Also, the present invention was developed in view of these issues and an object thereof is to provide an image forming device and image forming method for printing sheets such that the binding margin is positioned at a specified binding margin position and such that the side where the binding margin is positioned is the cutting edge.

SUMMARY OF THE INVENTION

In order to resolve the problems, according to a first aspect of the present invention an image forming device has: data writing means for storing image data input as a plurality of pages to first storage means; array generating means for generating a data array, within second storage means, of identification data indicating the storage location of each item of image data in the first storage means arranged in a predetermined order; and printing means for reading and printing on sheets the image data from the first storage means based on the data array generated by the array generating means.

According to a second aspect of the present invention, the image forming device of the first aspect has the array generating means generate a first array by storing the identification data in the second storage means in ascending order by page number; generate a second array by sorting into descending order by page number and storing in the second storage means the first half of the first array, when the cutting position instruction data input by the user indicates cutting on the left side, and the second half of the first array, when cutting on the right side is indicated, and generate a data array by storing alternately in the second storage means the identification data of the first half and the second half of the second array.

According to a third aspect of the present invention, the image forming device of the first aspect includes punching means for punching a total of four or more holes, two holes per side, at symmetrical positions with respect to the center line of the sheet which underwent print processing.

An image forming method of the fourth aspect includes the steps of: storing image data input as a plurality of pages to first storage means; generating a first array by storing in second storage means identification data indicating the storage location of each item of the image data arranged in ascending order by page number; generating a second array by sorting into descending order by page number and storing in the second storage means the first half of the first array, when the cutting position instruction data input by the user indicates cutting on the left side, and the second half of the first array, when cutting on the right side is indicated; generating a third array by storing alternately in the second storage means the identification data of the first half and the second half of the second array; and reading and printing on sheets the image data from the first storage means based on the third array.

In order to resolve the problems, the invention according to a fifth aspect of the present invention is an image forming device comprising: data writing means for storing image data input as a plurality of pages to storage means; binding margin preparing means for inputting binding margin position instruction data showing where to position the binding margin relative to the input orientation of the image data, and performing image processing to provide a binding margin according to the input binding margin position instruction data; image converting means for reading image data for a predetermined page and performing image processing, based on the input binding margin position instruction data; and image printing means for reading from the storage means in ascending page order and printing on sheets the image data generated by the image converting means.

According to a sixth aspect of the present invention, the image forming device of the fifth aspect has the image converting means perform image processing, according to the binding margin position instruction data input by the user, to rotate the image data of alternate pages, so that the top and bottom of the image are reversed with the plane of rotation being the sheet when printing image data.

An image forming method according to the seventh aspect of the present invention includes the steps of: storing image data input as a plurality of pages to storage means; inputting binding margin position instruction data showing where to position the binding margin relative to the input orientation of the image data; performing image processing to provide a binding margin according to the input binding margin position instruction data; reading image data for a predetermined page and performing image processing, based on the input binding margin position instruction data; and reading from the storage means in ascending page order and printing on sheets the image data generated by the image converting means.

The invention according to the first aspect allows for printing with a modified output order according to usage, because it is possible to perform print processing on printing sheets, regardless of the input order of the document images input with a scanner or the like to the image forming device.

The invention according to the second and fourth aspects allows for aligning sheets and stacking sheets in page number order, when the user cuts sheets on the center line and stacks the sheets, because it is possible to print one document image page on the back of a sheet of two document pages.

The invention according to the third aspect makes it possible to align sheets and to stack sheets in page number order, when sheets are stacked, because sheets are printed with one document image page on the back of a sheet of two document pages and cut down the center line.

The invention according to the fifth and seventh aspects allows for positioning a binding margin, according to the user's set binding margin position, performing printing with image processing performed by page, on a document image input with a scanner or the like to an image forming device.

The invention according to the sixth aspect allows for sheets to be produced with the cutting edge on the binding margin side of all pages and for aligning the pages, when two pages of document images are printed on one side of a sheet that is the size of two document pages and the user cuts the sheets on the center line and stacks the sheets.

DETAILED DESCRIPTION OF THE PREFERRED EMBODIMENTS

First Embodiment

An image forming device according to the present invention is an image forming device for performing image processing such as reduction, enlargement, layout, and the like for image data read from a scanner or a host computer connected on a network; examples include copiers, printers, facsimile machines, multi-function machines, or the like.

Figure 3:
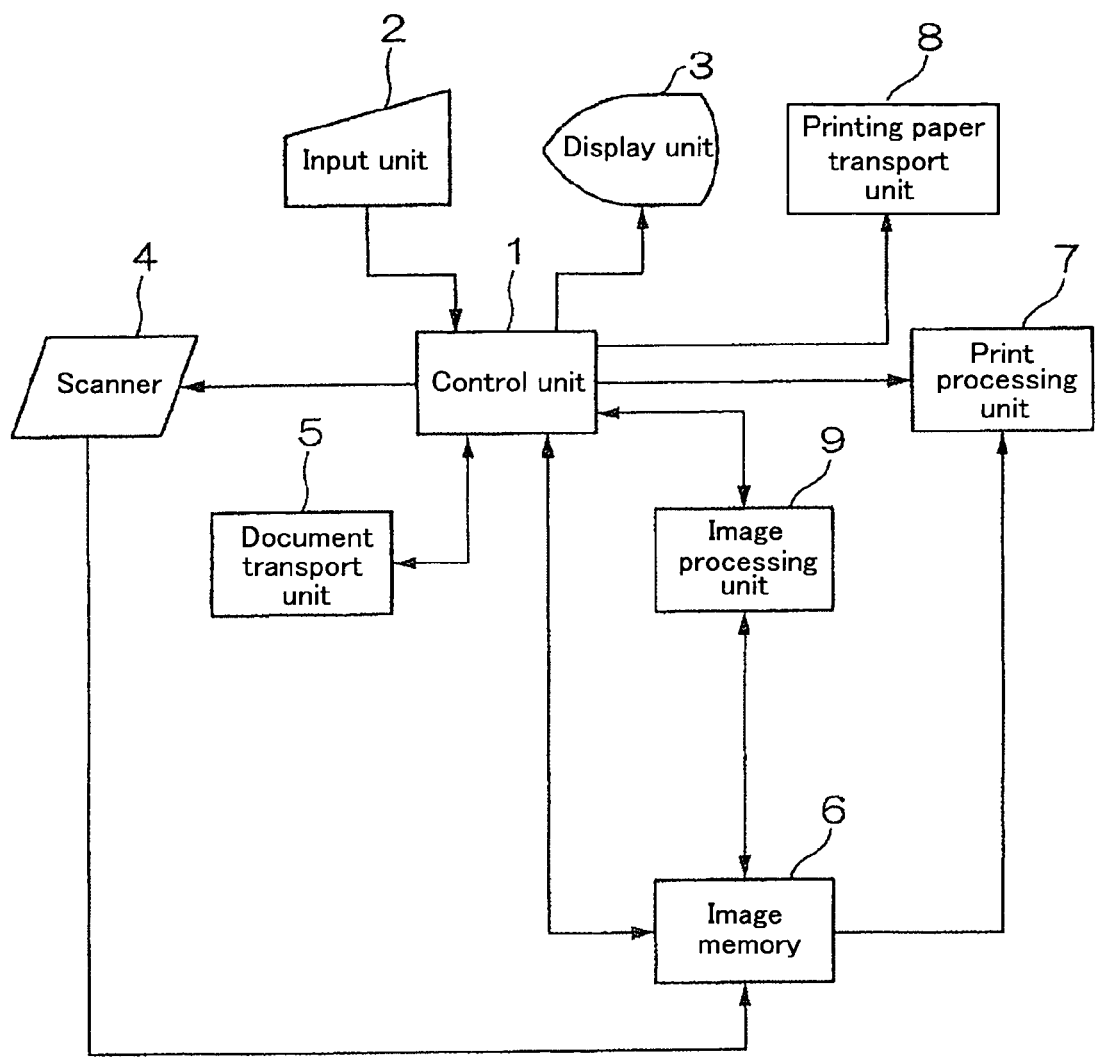
FIG. 3 is a block diagram showing the constitution of a first embodiment of the present invention.

An image forming device according to the first embodiment, in a copier according to the present invention, is described below with reference to the drawings. FIG. 3 is a block diagram showing the constitution of this embodiment. The reference 1 is a control unit for administering and controlling the processing operations of the image forming device. The reference 2 is an input unit comprising a touch panel, function keys, numeric key pad, keyboard and the like. The reference 3 is a display unit comprising a liquid crystal display or the like. The reference 4 is a scanner comprising a document loader for positioning a multi-page document and a read document tray for containing a read multi-page document when the image forming device is used as a copier; the scanner 4 has functions for detecting whether a document is presently placed thereon, and for reading a document placed on the document loader as image data. The reference 5 is a document transport unit for transporting a document read by the scanner 4 from the document loader to the read document tray. The reference 6 is image memory for storing image data read with the scanner 4 and the number of document pages, when the image forming device is used as a copier. The reference 7 is a print processing unit comprising a paper tray holding a plurality of unprocessed print sheets and a printed paper tray for holding a plurality of printed sheets, and which prints image data stored in the image memory 6 on printing sheets. The reference 8 is a printing paper transport unit for feeding unprocessed sheets from the paper tray to the print processing unit 7, and delivering the printed sheets from the print processing unit 7 to the printed sheet tray, when the image forming device is employed as a copier. The reference 9 is an image processing unit for performing image processing such as reduction, enlargement, layout modification, and the like on image data stored in the image memory 6.

Figure 4:
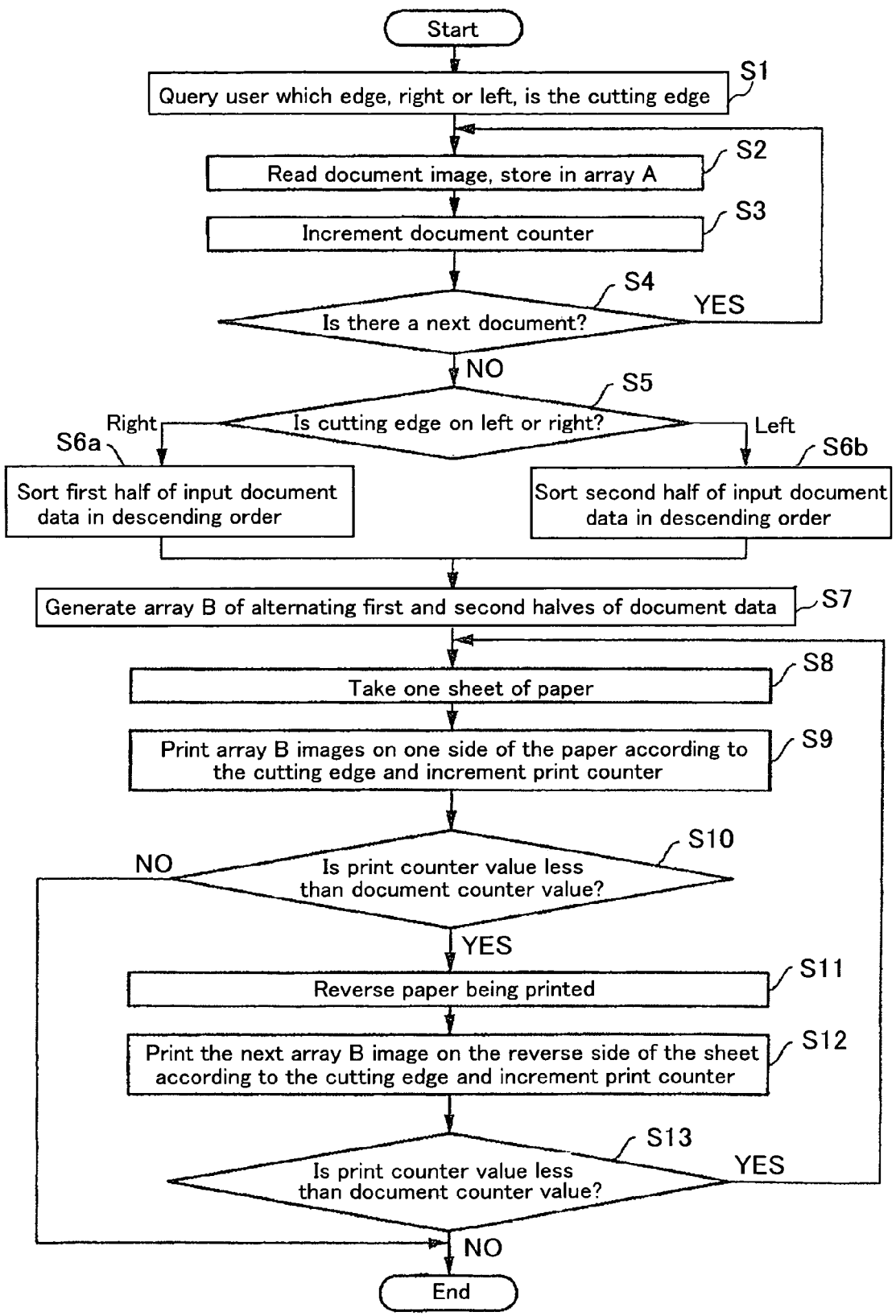
FIG. 4 is a flowchart showing the operations of image formation in this embodiment.

Next, the operation of the image forming device shown in FIG. 3 is described with reference to the flowchart shown in FIG. 4.

Figure 1:
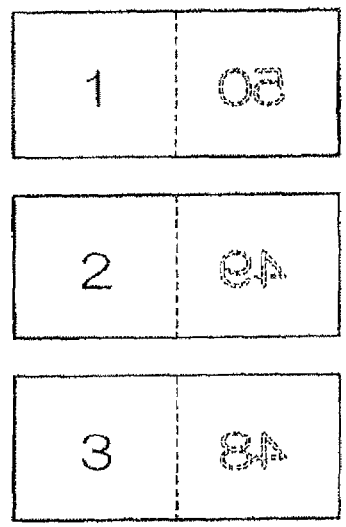
FIG. 1 is a plan view showing the relationship between the printed pages and the cutting edges in the case of a fifty page document with the right side printed on the reverse, according to a first embodiment of the present invention.
Figure 2:
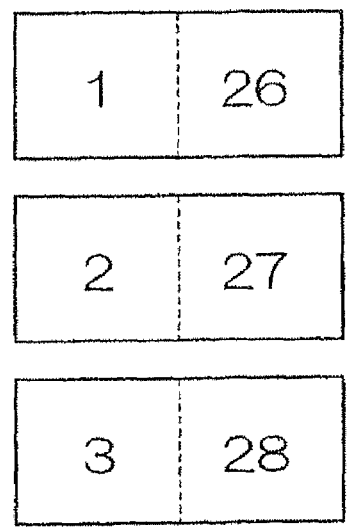
FIG. 2 is a plan view showing the relationship between the printed pages and cutting edges in the case of a fifty page document with the right side printed on the reverse, according to the latter, conventional technology described above.
Figure 5:
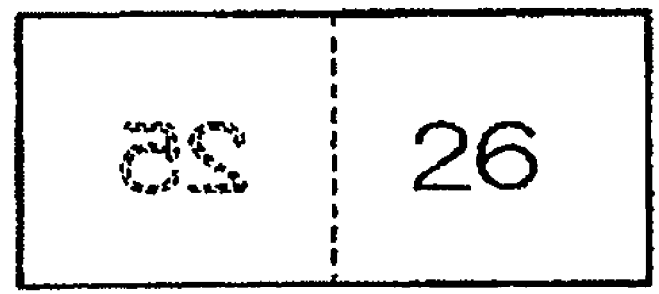
FIG. 5 is a plan view showing the relationship between the printed pages and the cutting edges in the case of a fifty page document with the left side printed on the reverse, according to this embodiment.
Figure 5:
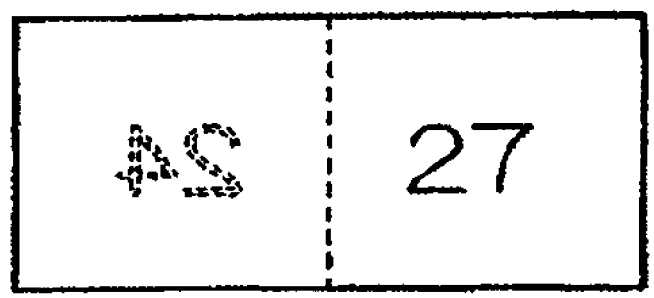
Figure 5:
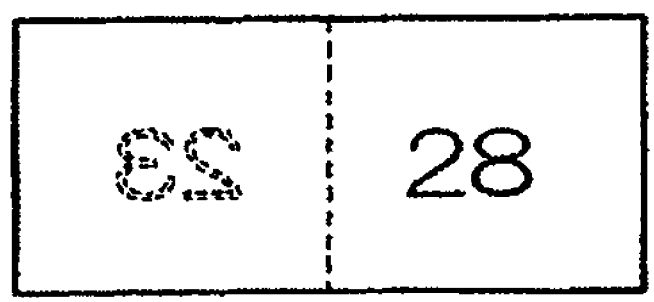

The user places a document of multiple pages on the document loader of the scanner 4. An instruction to start copying the document is input to the image forming device from the input unit 2. In response thereto, the control unit 1 of the image forming device causes the display unit 3 to display a query as to which edge, left or right, of the printed and cut sheet, will be the cutting edge, for image positioning when copying. The display for this query is displayed on the display unit 3 as the printing results, as shown in FIG. 5 for a fifty page document with the left edge as the cutting edge, or as shown in FIG. 1 for a fifty page document with the right edge as the cutting edge, along with the display of a selection screen (Step S1).

Figure 6:
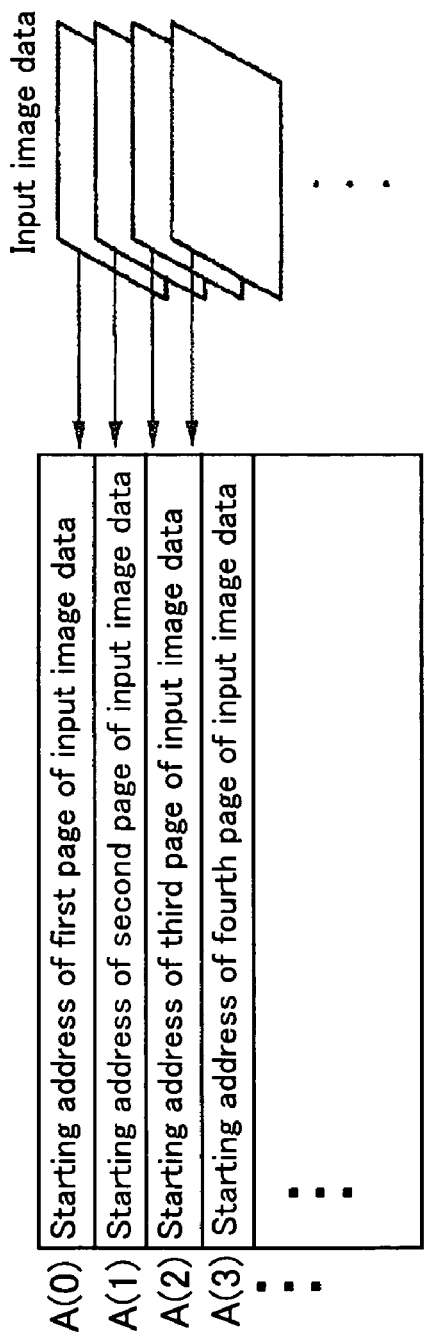
FIG. 6 is a schematic view showing the state in which the array A stores the addresses of the image data, according to this embodiment.

The user inputs the response to Step S1 from the input unit 2. The control unit 1 of the image forming device temporarily stores the user's response data in a memory region and sends the image reading instruction to the scanner 4. A document counter for counting the number of document pages is prepared and initialized to zero. The scanner 4 reads the first page of the document placed on the document loader and stores the input image data to the image memory 6. The control unit 1 generates an empty pointer array A, which can store addresses in the image memory 6 for each item of input image data, points the array element A(0) to the starting address of the first page of document image data stored in the image memory 6 (Step S2), and increments the document counter (Step S3). Next, the control unit 1 causes the document transport unit 5 to transport the first page of the document which has been read to the read document tray of the scanner 4. Thereafter, it is determined whether there is a next document in the scanner 4 (Step S4). If there is a next document, the image forming device returns to Step S2 and repeats the process, then continues to repeat the process until no documents are left on the document loader. Finally, the array A stores the addresses of the input image data, in the input order, as shown in FIG. 6.

Figure 7:
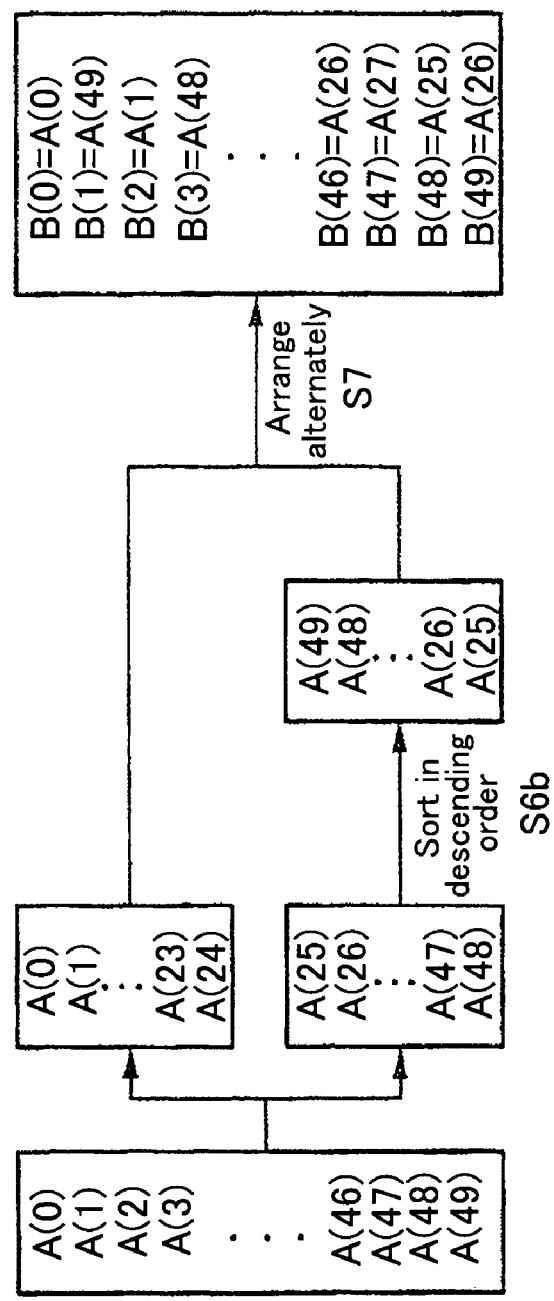
FIG. 7 is a schematic view showing the operations in which the image processing unit processes image data, according to this embodiment.

Next, the control unit 1 transmits an image processing request to the image processing unit 9, along with the response data obtained in Step S1. The image processing unit 9 determines whether the transmitted response data is an instruction for the left or the edge of the printed and cut sheet to be the cutting edge (Step S5). Next, the image processing unit 9 divides the array A into first and second halves. At this time, when the document has an odd number of pages, either the first half or, conversely, the second half of the array may be greater than the other half by one. Next, the image processing unit 9 sorts the first half of the array in reverse order, meaning descending page order, when the response data is an instruction to cut on the left edge of the document sheet (Step S6a). At this time, when the response data is an instruction that the right edge of the printing paper is the cutting edge, the second half of the array is sorted in reverse order, meaning a descending page order (Step S6b). Thereafter, an array B is generated, and the addresses stored in the first half and the addresses stored in the second half of the array A are alternately stored therein (Step S7). For example, FIG. 7 shows an example of sorting the arrays in Steps S6b to S7, for a fifty page document, and when the response data from the control unit 1 indicate that the right edge of the printed and cut sheets is the cutting edge. Next, the image processing unit 9 notifies the control unit 1 that processing is complete.

Next, the control unit 1 instructs the printing paper transport unit 8 to feed printing paper. Also, a print counter for counting the number of pages printed is prepared and initialized to zero. The printing paper transport unit 8 feeds one sheet of printing paper from the paper tray to the print processing unit 7 (Step S8), and notifies the control unit 1 that feeding is complete. Upon notification, the control unit 1 sends a print instruction to the print processing unit 7. The print processing unit 7 prints the first item of image data in the array B on the printing paper and notifies the control unit 1 that processing is complete. Upon notification, the control unit 1 increments the print counter (Step S9), compares the print counter and the document counter (Step S10), and terminates processing if the value in the print counter is greater than or equal to the value in the document counter. Meanwhile, when the value in the print counter is less than the value in the document counter, the control unit 1 causes the printing paper transport unit 8 to reverse the printing paper with one side printed in Step S9 (Step S11).

Next, the control unit 1 causes the print processing unit 7 to print the next data item in the array B and increments the print counter (Step S12). Next, the values in the print counter and document counter are compared (Step S13), and the process is terminated if the value in the print counter is greater than or equal to the value in the document counter. Meanwhile, if the value in the print counter is less than the value in the document counter, the control unit 1 performs processing from Step S8. Thereafter, the processing of Steps S8 to S13 is repeated until all data in the array B has been printed.

The printed document obtained as a result is stacked and cut on the center line of the sheets; when the one stack of sheets of the first half of the pages is placed on the other stack of sheets of the second half of the pages, the cutting edges of the sheets are aligned for all pages and the sheets can be stacked so that the page numbers of the printed sheets are already in ascending order; as a result, there is no page sorting process and convenience is improved.

Figure 8:
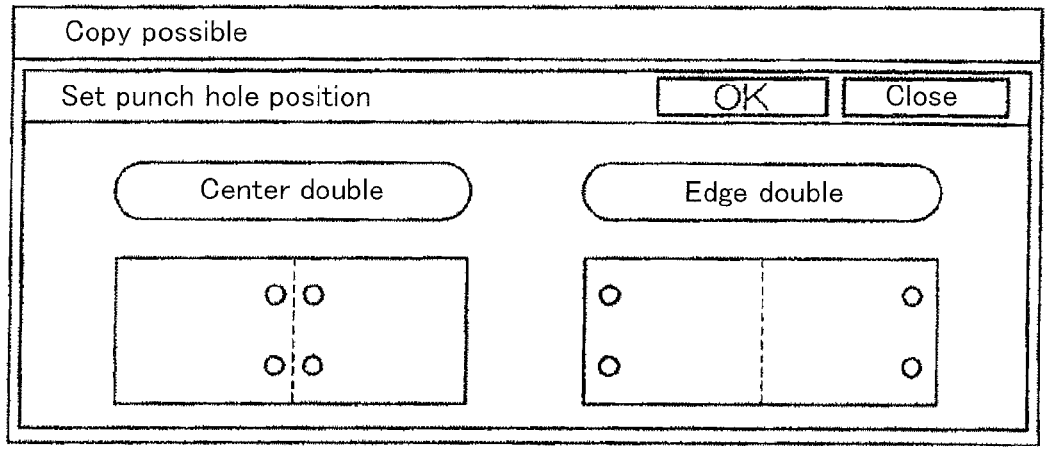
FIG. 8 is a plan view showing images of the binding hole punching results, displayed by the display unit of the image forming device when the former, conventional technology described above is employed.
Figure 9:
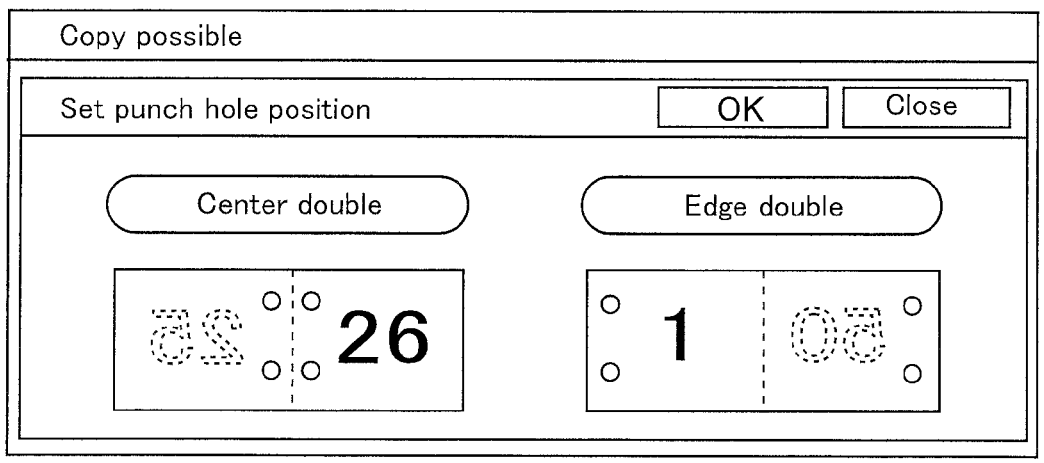
FIG. 9 is a plan view showing images of the binding hole punching results, displayed by the display unit of the image forming device, according to the first embodiment of the present invention.

The first embodiment can also be applied to copiers having a mechanism for punching binding holes. A prior art invention is an after-processing device for punching punch holes in a printed sheet; FIG. 8 is a plan view showing an image of punch processing results, to inform the user, displayed by the display unit of the image forming device. In the prior art, the cutting edges of the printed sheets may not be aligned when the printed sheets are stacked; with the present invention, however, the cutting edges of the sheets can be aligned when the printed sheets with punched binding holes are stacked, as shown in FIG. 9 in the plan view of the images of the binding hole punching results, displayed on the display unit 3 of the image forming device to inform the user.

In the first embodiment, the situation of a person placing a document on a document loader was described, but it is also possible for the image data to be transmitted from a user terminal when the image forming device is used as a printer, and the device is located on a network.

The first embodiment of the present invention was described with reference to the drawings, but the specific constitution is not limited to this embodiment and may include designs and the like that are within a scope not departing from the gist of this invention.

Second Embodiment

An image forming device according to the present invention is an image forming device for performing image processing such as reduction, enlargement, layout, and the like for image data read from a scanner or a host computer connected on a network; examples include copiers, printers, facsimile machines, multi-function machines, or the like.

Figure 11:
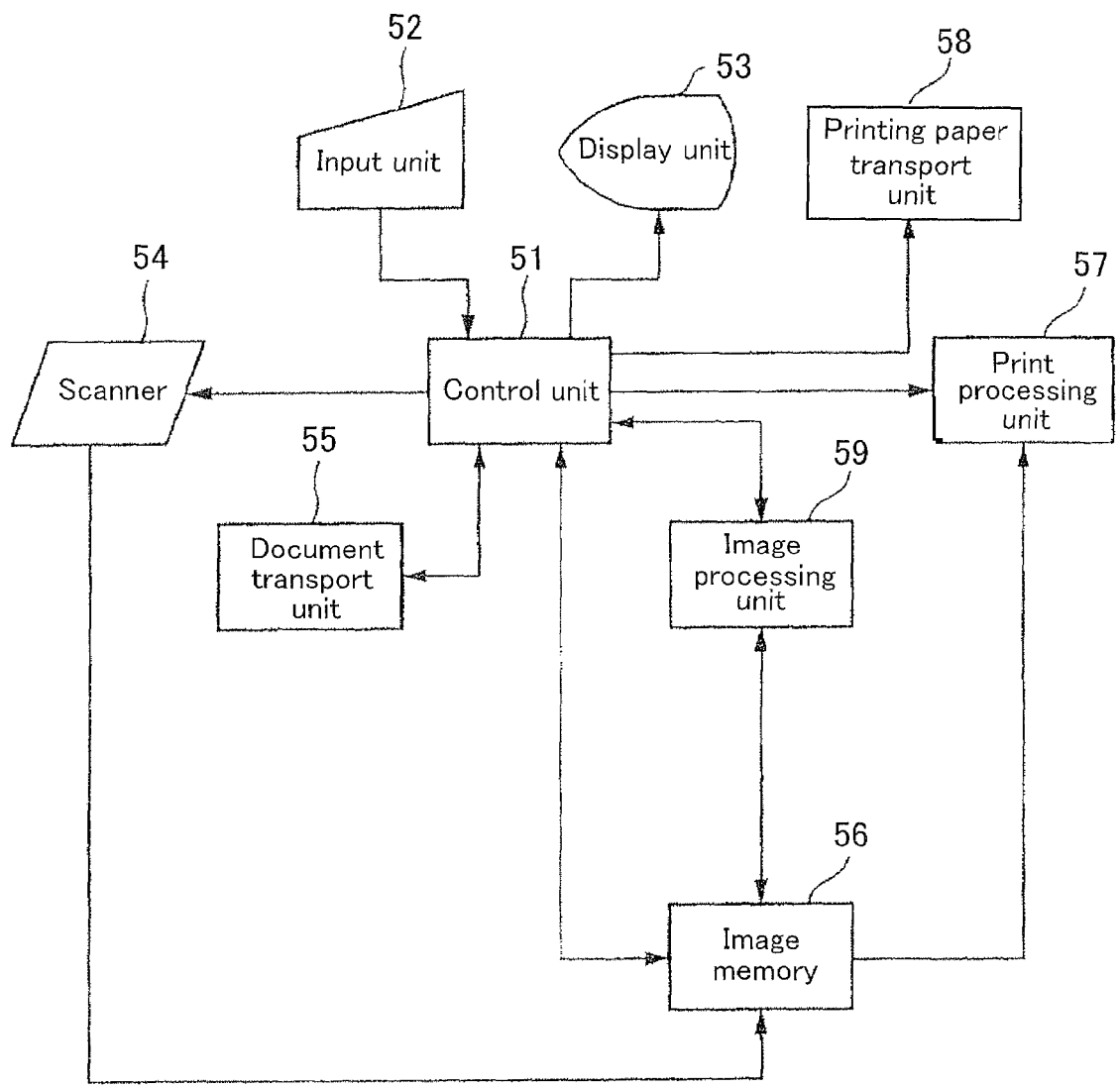
FIG. 11 is a block diagram showing the constitution of the second embodiment of the present invention.

An image forming device according to the second embodiment, in a copier according to the present invention, is described below with reference to the drawings. FIG. 11 is a block diagram showing the constitution of this embodiment. The reference 51 is a control unit for administering and controlling the processing operations of the image forming device. The reference 52 is an input unit comprising a touch panel, function keys, numeric key pad, keyboard, or the like. The reference 53 is a display unit comprising a liquid crystal display or the like. The reference 54 is a scanner comprising a document loader for positioning a multi-page document and a read document tray for containing a read multi-page document when the image forming device is used as a copier; and having functions for detecting whether a document is presently placed thereon, and for reading a document placed on the document loader as image data. The reference 55 is a document transport unit for transporting a document read by the scanner 54 to the read document tray from the document loader. The reference 56 is an image memory for storing image data read by the scanner 54 when the image forming device is used as a copier. The reference 57 is a print processing unit, comprising a paper tray for storing a plurality of pages of printing paper to be subject to printing, and a printed paper tray for storing a plurality of pages of printing paper after printing is complete; and which prints image data stored in the image memory 56 on the printing paper stored in the paper tray. The reference 58 is a printing paper transport unit for feeding printing paper for printing from the paper tray to the print processing unit 57, and delivering the printing paper after printing is complete from the print processing unit 57 to the printed paper tray, when the image forming device is used as a copier. The reference 59 is an image processing unit for performing image processing such as reduction, enlargement, layout modification, and the like on image data stored in the image memory 56.

Figure 12:
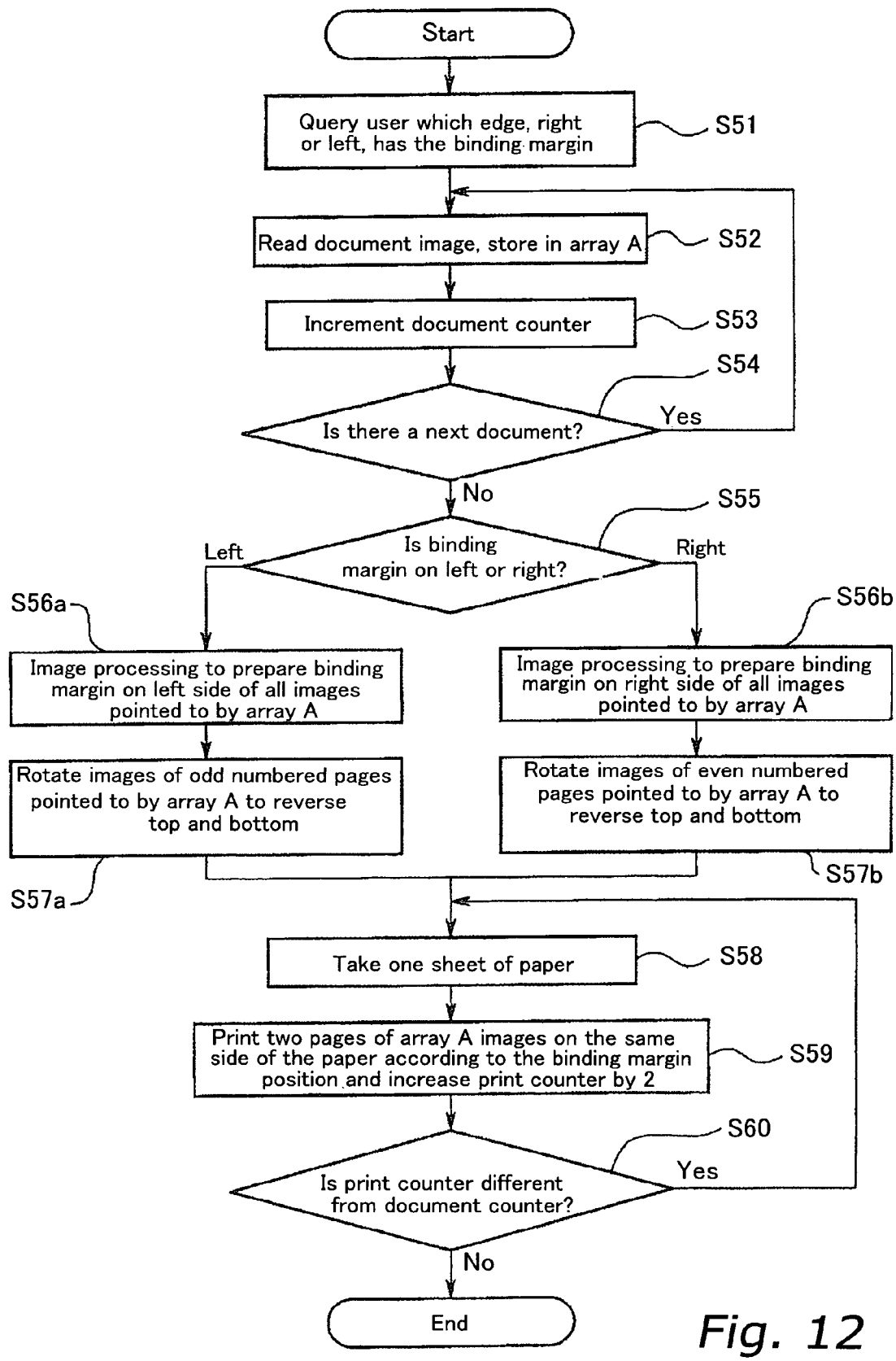
FIG. 12 is a flowchart showing the operations of image formation in this embodiment.

Next, the operation of the image forming device shown in FIG. 11 is described with reference to the flowchart shown in FIG. 12.

The user places a multi-page document on the document loader of the scanner 54, and inputs instructions to start copying the document to the image forming device from the input unit 52. Based on this input, the control unit 51 of the image forming device causes the display unit 53 to display a query regarding on which side, right or left, of the printed sheet to provide the binding margin (Step S51).

Figure 13:
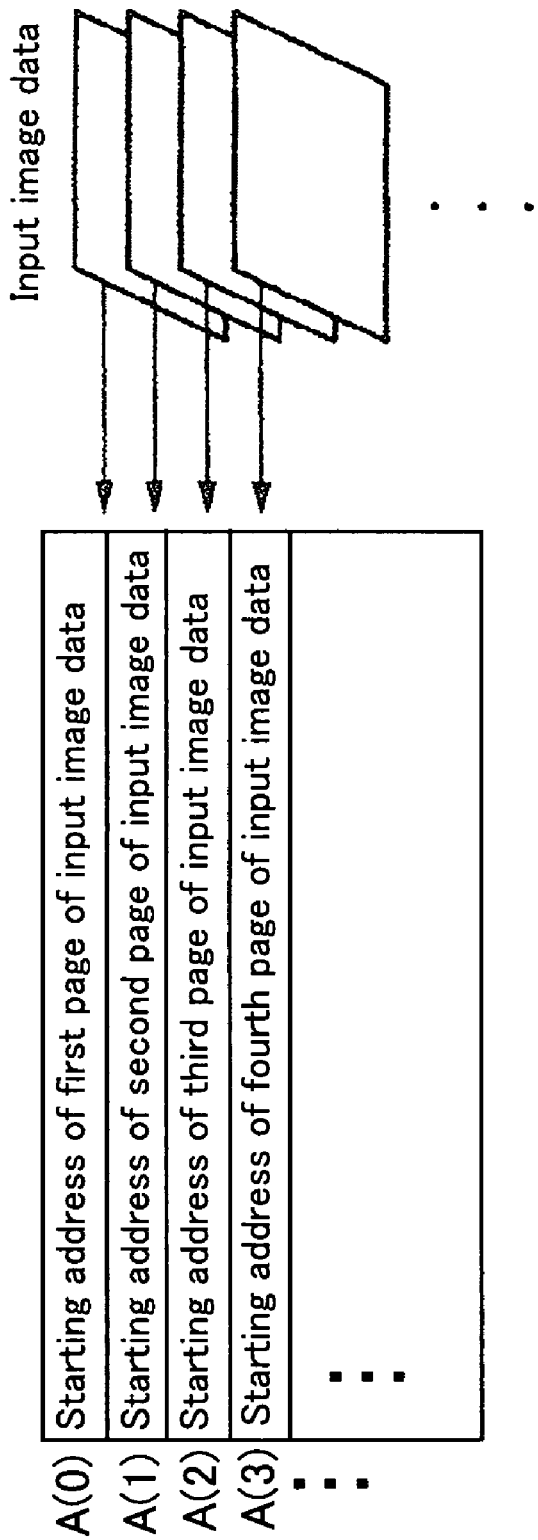
FIG. 13 is a schematic view showing the state in which the array A stores the addresses of the image data, according to this embodiment.
Figure 14:
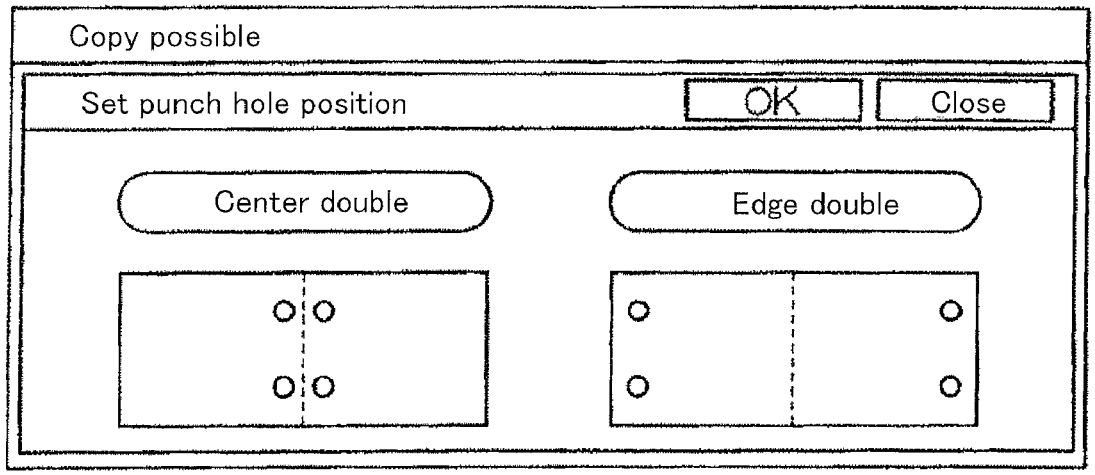
FIG. 14 is a plan view showing an example of printing results when the former, conventional technology described above is employed.
Figure 15:
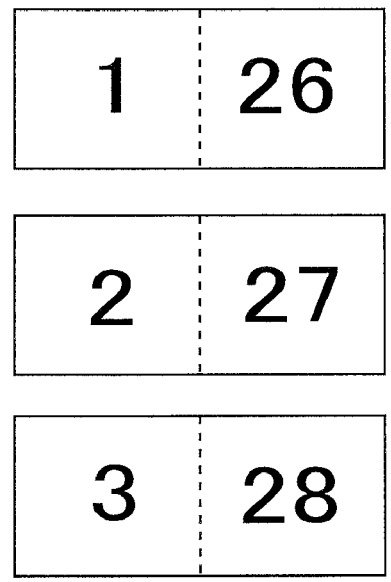
FIG. 15 is a plan view showing an example of printing results when the latter, conventional technology described above is employed.
Figure 16:
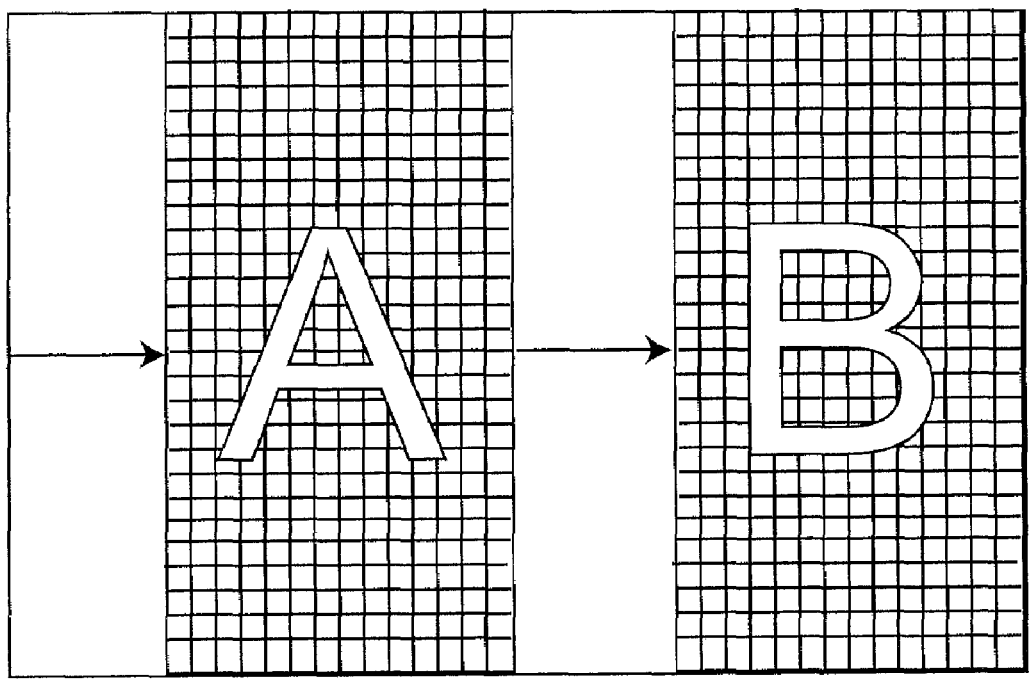
FIG. 16 is a plan view showing an example of printing results in the case of adding image processing to position the binding margins when the latter, conventional technology described above is employed.

The user inputs as response data a response to the query displayed on the display unit 53 from the input unit 52. The control unit 51 of the image forming device temporarily stores the user's response data in a memory region and sends the image reading instruction to the scanner 54. A document counter for counting the number of document pages is prepared and initialized to zero. Based on the instruction from the control unit 51, the scanner 54 reads the first page of the document on the document loader and stores the input image data in the image memory 56. The control unit 51 generates an empty pointer array A able to store addresses in the image memory 56 for each item of input image data, points the starting address of the first page of document image data stored in the image memory 56 to the array element A(0) (Step S52), and increments the document counter (Step S53). Next, the control unit 51 causes the document transport unit 55 to transport the first page of the document which has been read to the read document tray of the scanner 54. Thereafter, it is determined whether there is a next document in the scanner 54 (Step S54). If there is a next document, the image forming device returns to Step S52 and repeats the process, then continues to repeat the process until no documents are left on the document loader. Finally, the array A stores the addresses of the input image data, in the input order, as shown in FIG. 13.

Thereafter, the control unit 51 takes the response data obtained in Step S51 from the memory region and transmits this data, along with an image processing request, to the image processing unit 59. The image processing unit 59 determines whether the transmitted response data is an instruction to provide a binding margin on the left or right of the printed and cut sheet (Step S55).

Next, the image processing unit 59 references the address stored in the array A, reads the input image data, and performs image processing to make a binding margin on the left side of the input image data, when the response data from the control unit 51 is an instruction to provide a binding margin on the left of the input image data (Step S56a). Further, the image processing unit 59 performs image processing to reference the addresses stored in the odd numbered elements of the array A, read input image data of odd numbered pages, rotate by 180 degrees the images including the binding margin with the plane of rotation being the sheet when printing image data, and reverse the top and bottom of the image (Step S57a). At this time, when the response data from the control unit 51 is an instruction to provide a binding margin on the right of the input image data, image processing is performed to reference the addresses stored in the array A, read the input image data, and make a binding margin on the right side of the input image data (Step 56b). Further, the image processing unit 59 performs image processing to reference the addresses stored in the even numbered elements of the array A, read input image data of even numbered pages, rotate by 180 degrees the images including the binding margin with the plane of rotation being the sheet when printing image data, and reverse the top and bottom of the image (Step 57b).

Next, the control unit 51 instructs the printing paper transport unit 58 to feed printing paper. Also, a print counter for counting the number of pages printed is prepared and initialized to zero. The printing paper transport unit 58 feeds one sheet of printing paper from the paper tray to the print processing unit 57 (Step S58), and notifies the control unit 51 that feeding is complete. Upon notification, the control unit 51 sends a print instruction to the print processing unit 57. The print processing unit 57 references the addresses stored in the first and second elements of the array A, prints the two items of image data stored at those addresses on the same side of a sheet of printing paper, and notifies the control unit 51 that the process is complete. Upon notification, the control unit 51 increases the print counter by 2 (Step S59), compares the print counter and the document counter (Step S60), and terminates processing if the value in the print counter is greater than or equal to the value in the document counter. Meanwhile, if the value in the print counter is less than the value in the document counter, the control unit 51 performs processing from Step S58. Thereafter, the processing of Steps S58 to S60 is repeated until all data in the array A has been printed.

Figure 10:
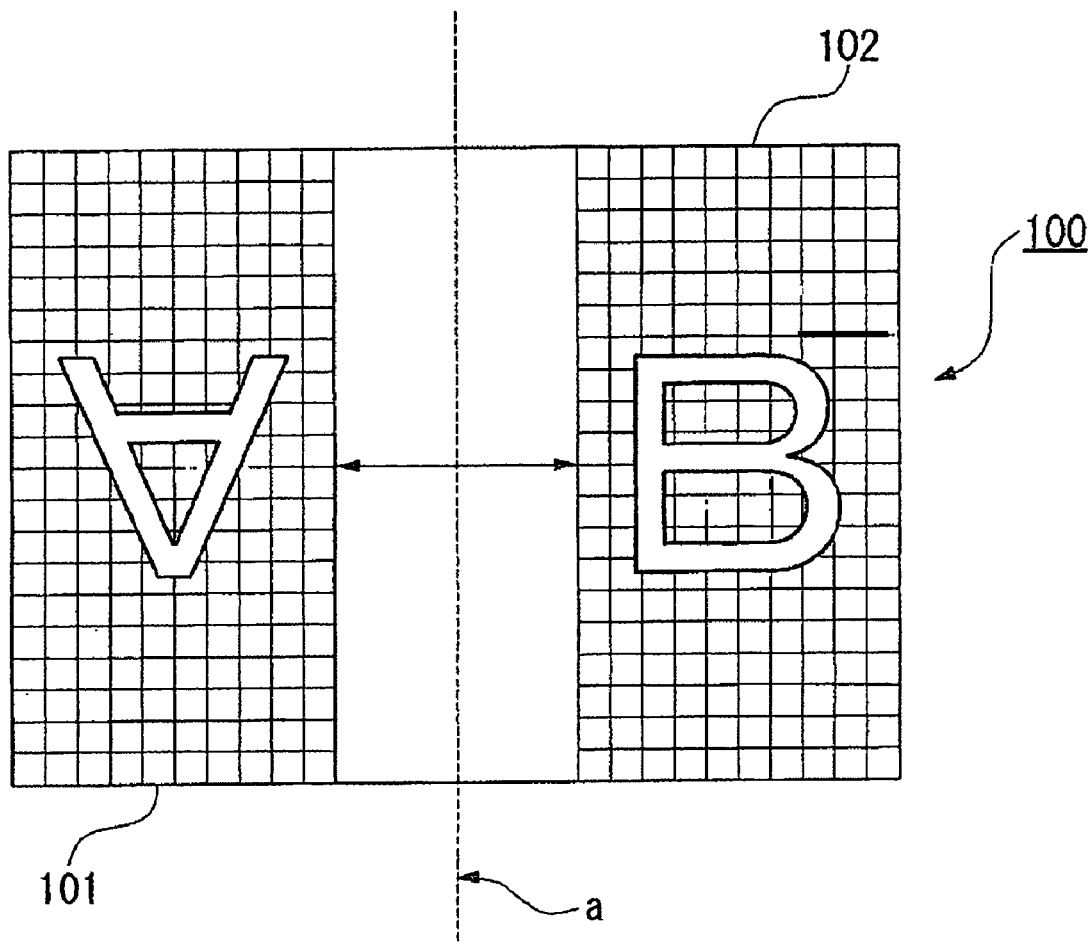
FIG. 10 is a plan view showing results of performing image processing to rotate 180 degrees document images on odd numbered pages and reverse the top and bottom, according to the second embodiment of the present invention.

FIG. 10 shows the printout printed by the image forming device according to the embodiment described above. Here, the printing paper shown by the reference 100 is cut on the center line of the sheet (reference a) and the sheets (references 101, 102) are stacked so that the image orientations are correct. Thereby, the uncut edges of the stacked sheets become aligned and the cutting edges of the sheets become the binding margin side for all pages.

In the second embodiment, the situation of a person placing a document on a document loader was described, but it is also possible for the image data to be transmitted from a user terminal when the image forming device is used as a printer, and the device is located on a network.

The second embodiment of the present invention was described with reference to the drawings, but the specific constitution is not limited to this embodiment and may include designs and the like that are within a scope not departing from the gist of this invention.

The invention claimed is:

1. An image forming device comprising:
   a data writing device being configured to store image data input as a plurality of pages to a first storage;
   an array generator being configured to generate a data array within a second storage of identification data indicating the storage location of each item of image data in the first storage arranged in a predetermined order, based on cutting position instruction data input by a user, the array generator:
   generating a first array by storing the identification data in the second storage in ascending order by page number,
   generating a second array by sorting into descending order by page number and storing in the second storage the first half of the first array, when the cutting position instruction data input by the user indicates cutting on the left side, and the second half of the first array, when cutting on the right side is indicated, and
   generating a data array by storing alternately in the second storage the identification data of the first half and the second half of the second array; and
   a printing section being configured to read and to print on sheets the image data from the first storage based on the data array generated by the array generator.

2. The image forming device recited in claim 1, further comprising a puncher that punches a total of four or more holes, two holes per side, at symmetrical positions with respect to the center line of the sheet that underwent print processing.

3. An image forming method comprising:
   storing image data input as a plurality of pages to a first storage;
   generating a first array by storing in a second storage identification data indicating the storage location of each item of the image data arranged in ascending order by page number;
   generating a second array by sorting into descending order by page number and storing in the second storage the first half of the first array, when the cutting position instruction data input by the user indicates cutting on the left side, and the second half of the first array, when cutting on the right side is indicated;
   generating a third array by storing alternately in the second storage the identification data of the first half and the second half of the second array; and
   reading and printing on sheets the image data from the first storage based on the third array.

4. An image forming device comprising:
   a data writer being configured to store image data input as a plurality of pages to a storage;
   array generator being configured to generate a data array within the storage of identification data indicating the storage location of each item of image data in the storage arranged in a predetermined order, based on cutting position instruction data input by a user, the array generator
   generating a first array by storing the identification data in the storage in ascending order by page number,
   generating a second array by sorting into descending order by page number and storing in the storage the first half of the first array, when the cutting position instruction data input by the user indicates cutting on the left side, and the second half of the first array, when cutting on the right side is indicated, and
   generating a data array by storing alternately in the storage the identification data of the first half and the second half of the second array;
   a binding margin preparer being configured to input binding margin position instruction data showing where to position the binding margin relative to the input orientation of the image data, and performing image processing to provide a binding margin according to the input binding margin position instruction data;
   an image converter being configured to read image data for a predetermined page and to perform image processing, based on the input binding margin position instruction data; and
   an image printing section being configured to read from the storage in ascending page order and to print on sheets the image data generated by the image converter.

5. The image forming device recited in claim 4, wherein the image converter performs image processing, according to the binding margin position instruction data input by the user, to rotate the image data of alternate pages, so that the top and bottom of the image are reversed with the plane of rotation being the sheet when printing image data.

6. An image forming method comprising:
   storing image data input as a plurality of pages to a storage;
   generating a first array by storing in the storage identification data indicating the storage location of each item of the image data arranged in ascending order by page number;
   generating a second array by sorting into descending order by page number and storing in the storage the first half of the first array, when the cutting position instruction data input by the user indicates cutting on the left side, and the second half of the first array, when cutting on the right side is indicated;
   generating a third array by storing alternately in the storage the identification data of the first half and the second half of the second array;
   inputting binding margin position instruction data showing where to position the binding margin relative to the input orientation of the image data, and performing image processing to provide a binding margin according to the input binding margin position instruction data;
   reading image data for a predetermined page and performing image processing, based on the input binding margin position instruction data; and
   reading from the storage and printing on sheets the image data generated by the image converter.

\* \* \* \* \*